United States Patent
Flood et al.

(10) Patent No.: US 8,319,163 B2
(45) Date of Patent: Nov. 27, 2012

(54) ROLL ISOLATION BEARING

(75) Inventors: William M. Flood, Coon Rapids, MN (US); Paul M. O'Brien, Champlin, MN (US); Eugene W. Carlson, Elk River, MN (US)

(73) Assignee: BAE Systems Land & Armaments, L.P., Santa Clara, CA (US)

( * ) Notice: Subject to any disclaimer, the term of this patent is extended or adjusted under 35 U.S.C. 154(b) by 712 days.

(21) Appl. No.: 12/500,333

(22) Filed: Jul. 9, 2009

(65) Prior Publication Data

US 2012/0217338 A1 Aug. 30, 2012

Related U.S. Application Data

(60) Provisional application No. 61/079,303, filed on Jul. 9, 2008.

(51) Int. Cl.
*F42B 10/26* (2006.01)
*F42B 10/60* (2006.01)
*F42B 10/14* (2006.01)

(52) U.S. Cl. ........ 244/3.24; 244/3.1; 244/3.23; 102/501

(58) Field of Classification Search .............. 244/3.1, 244/3.21, 3.23, 3.24, 3.27, 3.28, 3.29; 384/127, 384/624; 102/473, 501
See application file for complete search history.

(56) References Cited

U.S. PATENT DOCUMENTS

| | | | |
|---|---|---|---|
| 4,389,028 A | 6/1983 | Kalivretenos et al. | |
| 4,923,142 A | 5/1990 | Creusot et al. | |
| 6,126,109 A | 10/2000 | Barson et al. | |
| 6,502,786 B2 | 1/2003 | Rupert et al. | |
| 6,511,016 B2 | 1/2003 | Bar et al. | |
| 6,761,330 B1 * | 7/2004 | Bittle et al. | 244/3.23 |
| 6,796,525 B2 | 9/2004 | Johnsson et al. | |
| 6,866,775 B1 | 3/2005 | Gonzalez et al. | |
| 7,163,176 B1 | 1/2007 | Geswender et al. | |
| 7,354,017 B2 * | 4/2008 | Morris et al. | 244/3.23 |
| 7,412,930 B2 * | 8/2008 | Smith et al. | 102/473 |
| 7,584,922 B2 * | 9/2009 | Bar et al. | 244/3.24 |
| 7,718,937 B1 * | 5/2010 | Dunn et al. | 244/3.23 |
| 7,791,007 B2 * | 9/2010 | Harnoy | 244/3.21 |
| 8,076,623 B2 * | 12/2011 | Dryer | 244/3.23 |
| 8,119,959 B1 * | 2/2012 | Ransom | 244/3.22 |
| 2006/0065775 A1 * | 3/2006 | Smith et al. | 244/3.23 |
| 2008/0315032 A1 * | 12/2008 | Harnoy | 244/3.23 |

FOREIGN PATENT DOCUMENTS

| | | |
|---|---|---|
| JP | 10-206097 | 8/1998 |
| KR | 10-0519135 | 10/2005 |
| WO | WO 2010039322 A2 * | 4/2010 |

OTHER PUBLICATIONS

International Search Report, Application No. PCT/US2009/050124, Dated Apr. 30, 2010.

* cited by examiner

*Primary Examiner* — Joseph W Sanderson
(74) *Attorney, Agent, or Firm* — Patterson Thuente Christensen Pedersen, P.A.

(57) ABSTRACT

A GNC device for use with a projectile, includes a rotating GNC portion and a non-rotating GNC portion, the rotating GNC portion being fixedly coupled to a projectile body, at least one bearing being interposed between the rotating GNC portion and a non-rotating GNC portion, the at least one bearing permitting the rotating GNC portion to rotate with respect to the non-rotating GNC portion. In a GNC device for use with a projectile, a method is further included.

19 Claims, 6 Drawing Sheets

ROLL ISOLATION BEARING

RELATED APPLICATIONS

The present application claims the benefit of U.S. Provisional Application No. 60/079,303, filed Jul. 9, 2008 and incorporated herein in its entirety by reference.

TECHNICAL FIELD OF THE INVENTION

The present invention relates to gun launched projectiles. More particularly, the present invention relates to such projectiles that are guided after launch.

BACKGROUND OF THE INVENTION

There is need to improve the accuracy of artillery shells fired by large bore weapons. Technological advances in metallurgy, propulsion, guidance and control now make it feasible for artillery systems to attack targets at ranges greater than 20 miles. Artillery shells follow a ballistic trajectory, which in an ideal world can be determined mathematically from launch point to target. However, the real world is not as forgiving. Numerous factors affect the trajectory. Variations in temperature, wind and precipitation along with minute differences in manufacturing tolerances of the projectile, the barrel of the weapon, and the charge are just a few of the factors affecting the flight of a projectile. Moreover, there is typically no control of the projectile after launch. Therefore, as the range increases, the potential impact footprint of the projectile grows until it reaches the point where the projectile can no longer be relied upon to accomplish the desired mission. There is a need then to improve the accuracy of artillery projectiles through in-flight guided control.

Modern artillery barrels are rifled so as to create spin in the projectile. Without spinning, the projectile has a tendency to tumble which makes it impossible to determine with any level of confidence where the projectile is going to land. One consequence of spin is that it creates a yawing to the right (with right hand refilling twist) or side slip angle called the yaw of repose. When a projectile is fired at a range of 20 miles, the yaw of repose will result in a cross range deflection of about 1 mile. In order to control a spinning projectile a design balance must be reached between the need for control surfaces and the need to maintain the spin.

There a number of relatively recent patents relating to gun launched guided projectiles, including: U.S. Pat. No. 6,126,109 which relates to an unlocking tail fin assembly; U.S. Pat. No. 7,163,176 drawn to a two-dimensional projectile guidance approach; U.S. Pat. No. 6,126,109 discloses a device for an unlocking tail fin assembly; U.S. Pat. No. 7,163,176 is a second patent drawn to a two-dimensional projectile guidance approach; U.S. Pat. No. 6,796,525 owned by the assignee of the present application, discloses a concept for roll isolation of the tail assembly from the body of the projectile; U.S. Pat. No. 6,866,775 discloses a stabilizing tail fin concept for a gun launched projectile; and U.S. Pat. No. 6,502,786 is a third patent disclosing a two-dimensional guidance approach. These designs, in general, include a section that allows for deployment and operation of a surface, such as a canard, that adjusts the flight path. However, none of the aforementioned patents discloses any means for effecting roll isolation for the guidance and control section of the projectile. Accordingly, there is a need in the industry for roll isolation of a fully guidance capable three-dimensional guidance and control section that is detachable from the projectile.

SUMMARY OF THE INVENTION

The present invention substantially meets the aforementioned needs of the industry. The device of the present invention incorporates at least one roll bearing in the GNC section that decouples the projectile aft-body (payload and aft section and a first portion of the GNC section) from the fore-body (a second portion of the GNC section) allowing the payload and aft section and the first portion of the GNC section to rotate independently of the second portion of the GNC section. The roll bearing design of the present invention reduces the amount of inertia that control surfaces need to overcome, thereby permitting canard size to be reduced and to provide for a faster response. The roll bearings have been designed to survive the launch environment, to minimize transmitted torque from the aft section to the second portion of the GNC section, and to achieve minimized GNC space and weight allocations. Longitudinal and radial stops act to protect the bearings from excessive forces being transmitted to the bearings in the extremely harsh environment of gun launch and immediately thereafter.

As an example of the efficiency achieved by the present invention, only two canards are necessary to control the projectile as compared to the more standard four canard design. By going to two canards, the battery power provided in the Guidance Navigation and Control (GNC) section may be significantly reduced. It has been shown in the past that battery power and size has represented a critical design element for GNC sections.

The environment that the device of the present invention must be capable of operating in is extreme. Typically, the GNC section has a mass of about 15 pounds that, during launch from a gun barrel, for example, is accelerated at 18,000 g's. The resulting load is approximately 270,000 pounds reacted out on a bearing in 0.014 second followed by an extreme deceleration after the barrel is cleared. Such loads are imposed in both directions longitudinally. Additionally, after launch, there are side (lifting and balloting) loads that must be accounted for.

During gun launch of a projectile, the projectile is accelerated down the gun barrel and rotated by the barrel rifling. The inner and outer races of rolling element bearings of the present invention are allowed to deflect with respect to each other until the first portion of the GNC structure contacts the second portion of the GNC structure, thereby protecting the bearings from the intense loads imparted to the projectile. Such structure acts as a stop, the stop bearing the launch load and thereby isolating the bearings from the extreme loads. The first and second portions of the GNC section are then locked together and rotate with the projectile. Launch load, the extreme loads noted above, is reacted through the projectile structure, i.e., the above noted stops, until the launch event is completed. At completion, the bearing races of the present invention then return to their nominal position, thereby disengaging the first and second portions of the GNC section, which allows the aft projectile section and the first portion of the GNC section to freely rotate while the second portion of the GNC section remains stationary, as controlled by deployed canards. Transverse loads are accounted for in much the same way, whereby structural stops act to isolate the bearings from such loads.

The present invention is a GNC device for use with a projectile and includes a rotating GNC portion and a non-rotating GNC portion, the rotating GNC portion being fixedly coupled to a projectile body, at least one bearing being interposed between the rotating GNC portion and a non-rotating GNC portion, the at least one bearing permitting the rotating GNC portion to rotate with respect to the non-rotating GNC portion. A method is further included.

BRIEF DESCRIPTION OF THE DRAWINGS

The invention may be more completely understood in consideration of the following detailed description of various embodiments of the invention in connection with the accompanying drawings, in which.

Figure 1:
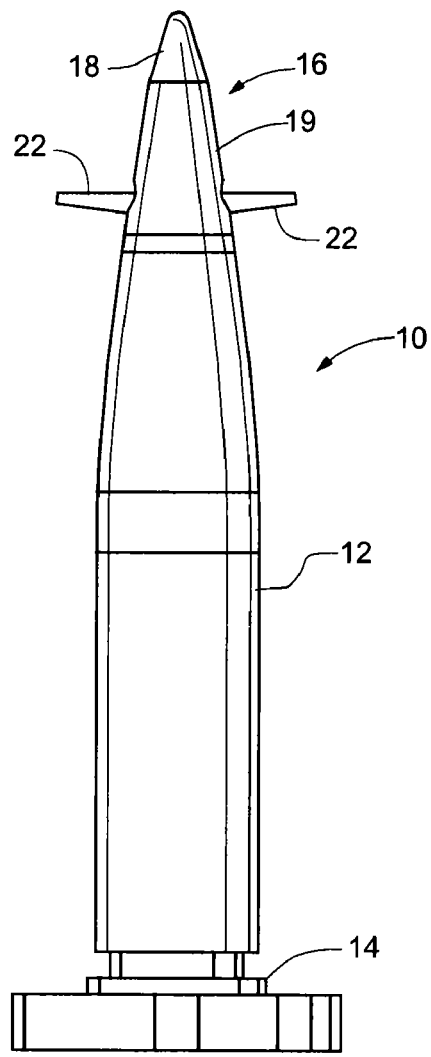
FIG. 1 is a side perspective view of a projectile, including a GNC section employing the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

A depicted in FIG. 1, a projectile is shown generally at 10. The projectile 10 is an exemplary round meant to be discharged from a 155 millimeter gun. It is to be understood that the present invention can be used with other guided projectiles, including projectiles that are gun launched, rocket powered, and combinations of both.

The projectile 10 includes a projectile body 12 having a rear control unit 14 mounted at the after end thereof. The nose of the projectile 10 is capped with a removable GNC section 16. The GNC section 16 is preferably threaded into threads (not shown) defined in the projectile body 12. Such threads are typically used for a plurality of selective fuses that may be readily installed in the field in the projectile 10. The GNC section 16 (or alternative use fuse) may be installed immediately prior to launch of the projectile.

Figure 2:
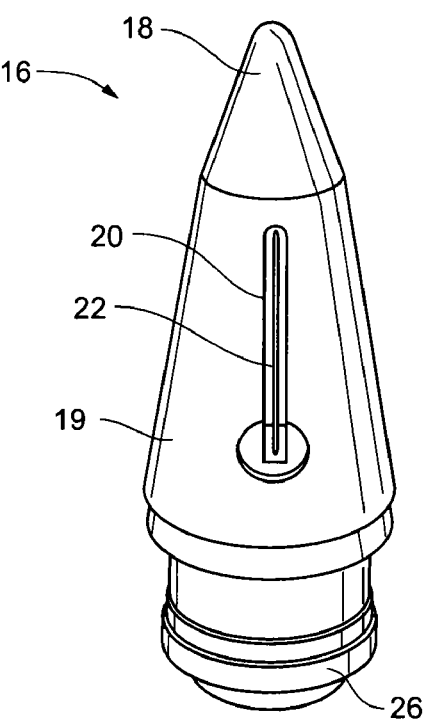
FIG. 2 is a perspective view of the GNC section of FIG. 1.

The GNC section 16 provides for guidance, navigation, and control (as well as fuzing), hence the acronym GNC, of the projectile 10 after the launch thereof. The GNC section 16 includes a cone structure 18. The cone structure 18 is preferably operably coupled to the GNC body 19. In a preferred embodiment, the GNC body 19 has a pair of opposed canard slots 20 defined therein. A canard 22 is shiftably disposed in each of the respective canards slots 20. The inflight disposition with the canards 22 deployed is depicted in FIG. 1 while the launch disposition of a respective canard 22 with the canard 22 retracted is depicted in FIG. 2. Each of the canards 22 is pivotable about a canard pivot 24, depicted in FIG. 4 for deployment and is further pivotable about the longitudinal axis 35 thereof for effecting control of the projectile 10. The longitudinal axis 35 is disposed orthogonal to a central axis of the pivot 24.

A plurality of threads 26 are defined about the external margin of the trailing section of the GNC body 19. The threads 26 may be threadedly engaged with the interior threads described above that are defined within the projectile body 12. In such manner, the GNC section 16 may be readily coupled to the projectile body 12 immediately prior to launch of the projectile 10, as noted above.

Figure 3:
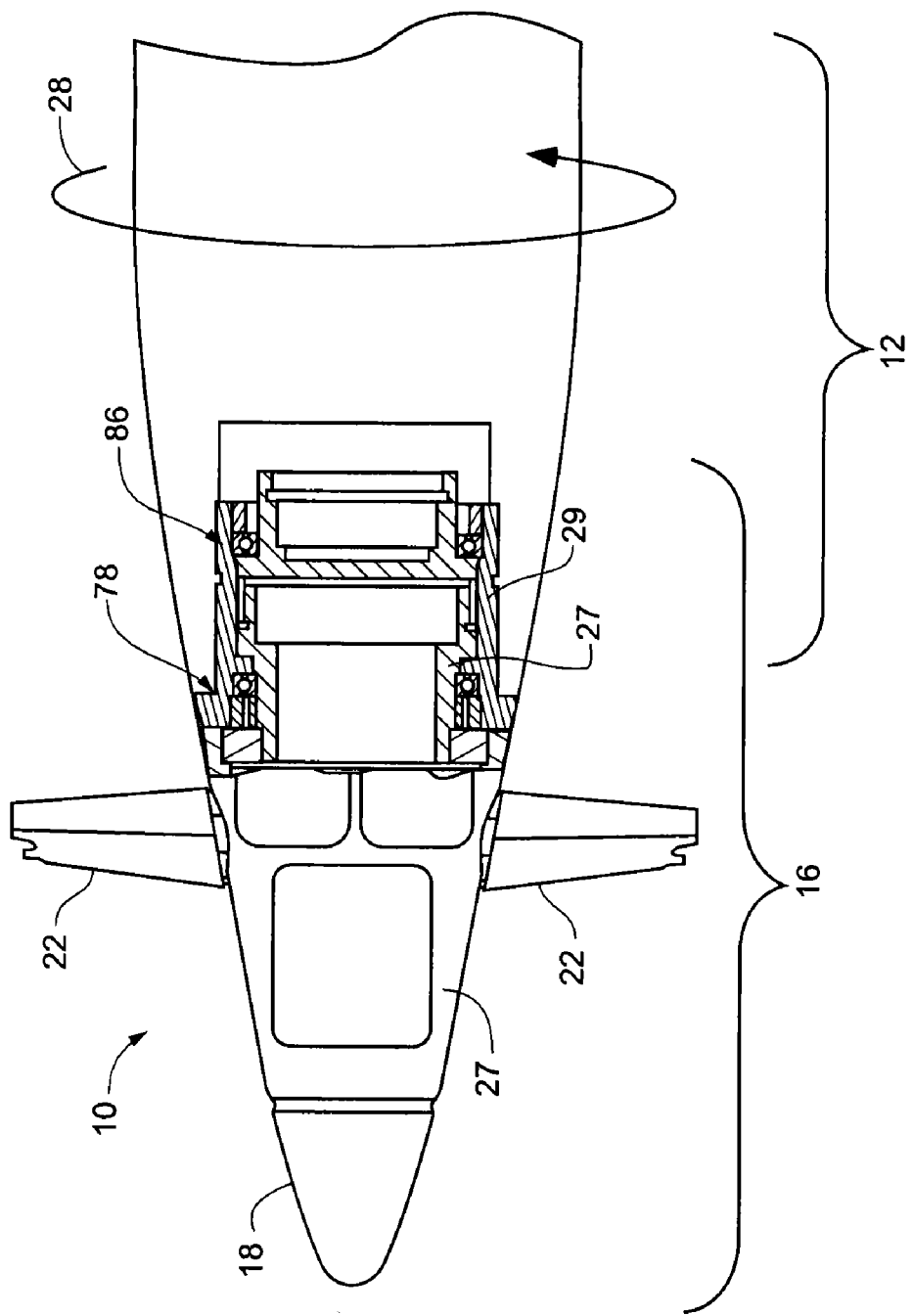
FIG. 3 is a sectional view of the GNC section mounted to the projectile.

FIG. 3 depicts the GNC section 16 coupled to the projectile body 12 in the inflight disposition with the canards 22 deployed. While in flight in the unloaded condition, the projectile body 12 rotates as indicated by the arrow 28. Such rotation is effected by the rifling of the gun barrel during launch of the projectile 10 and acts to stabilize the projectile 10. The non-rotating portion 27 of the GNC section 16 is maintained in a non-rotating state during flight by means of the canards 22. The rotating portion 29 of the GNC section 16 rotates with the projectile body 12 in a manner indicated by the arrow 28. The bearings 78 and 86, described in greater detail below, provide for relatively free rotation of the rotating portion 29 with respect to the non-rotating portion 27. In such manner, the projectile body 12 is stabilized by the rotation as indicated by the arrow 28, while the non-rotating portion 27 of the GNC section 16 maintains a non-rotating disposition during flight of the projectile 10 and may effect guidance of the projectile 10.

Figure 4:
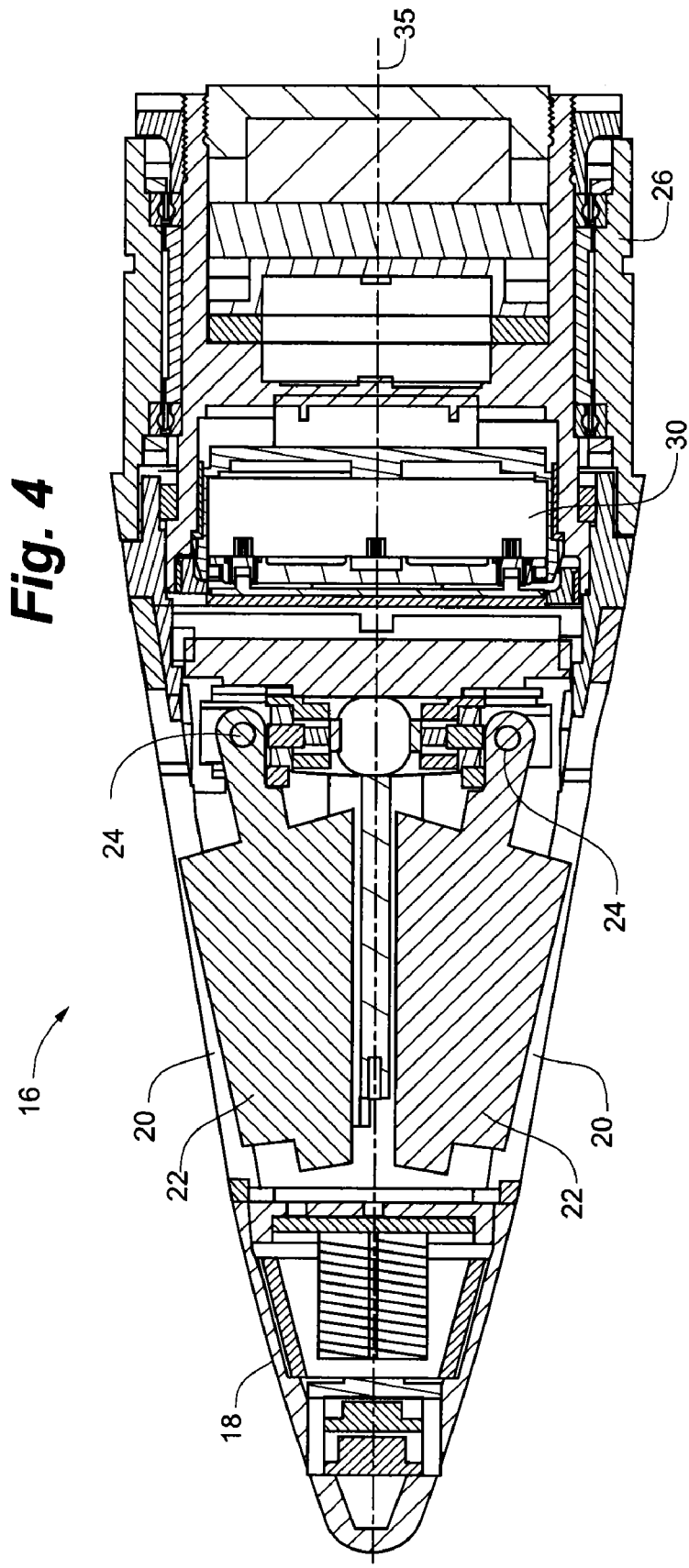
FIG. 4 is a sectional view of a GNC section employing the roller bearing system of the present invention.
Figure 5:
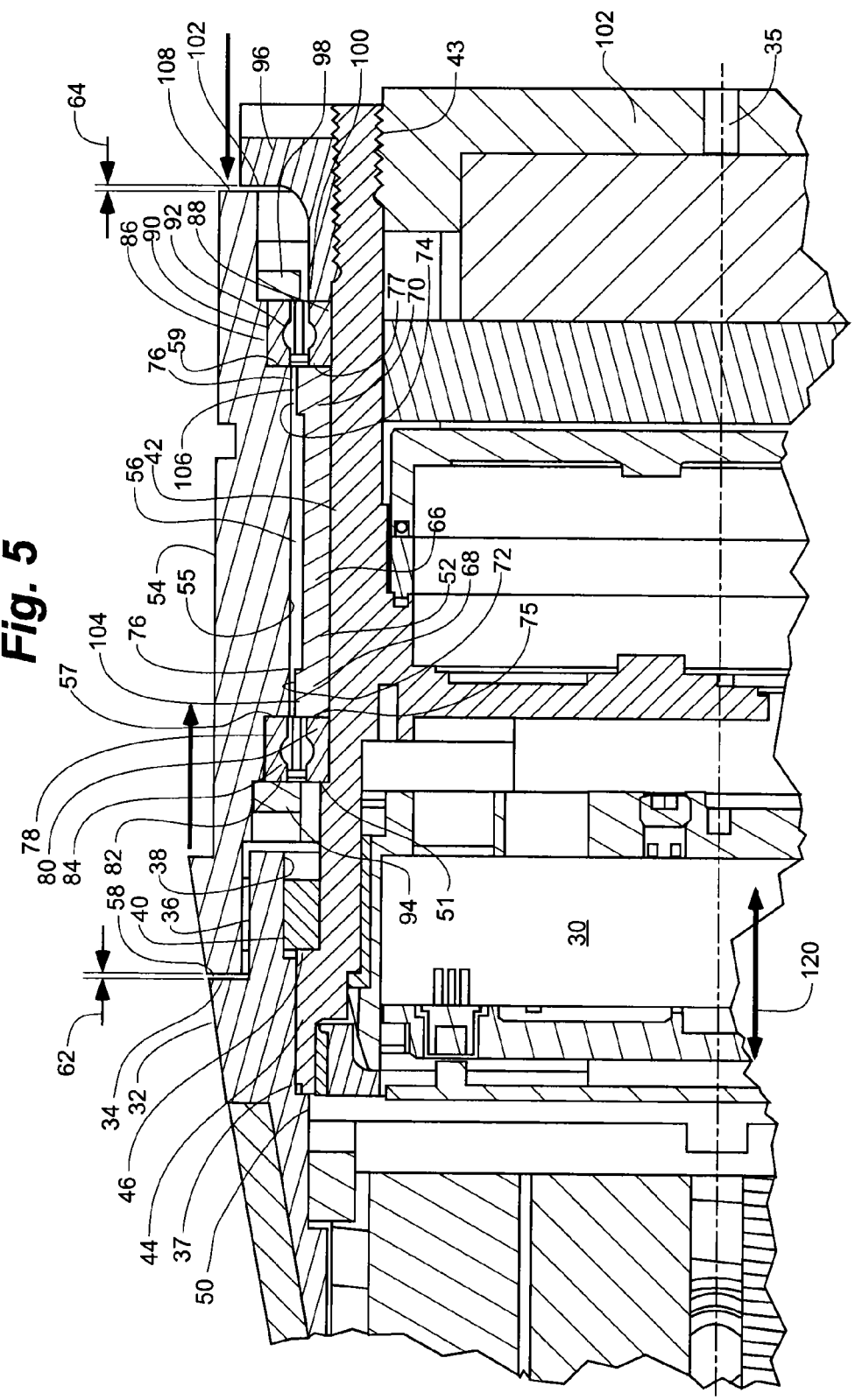
FIG. 5 is a sectional view of a portion of the GNC section.
Figure 6:
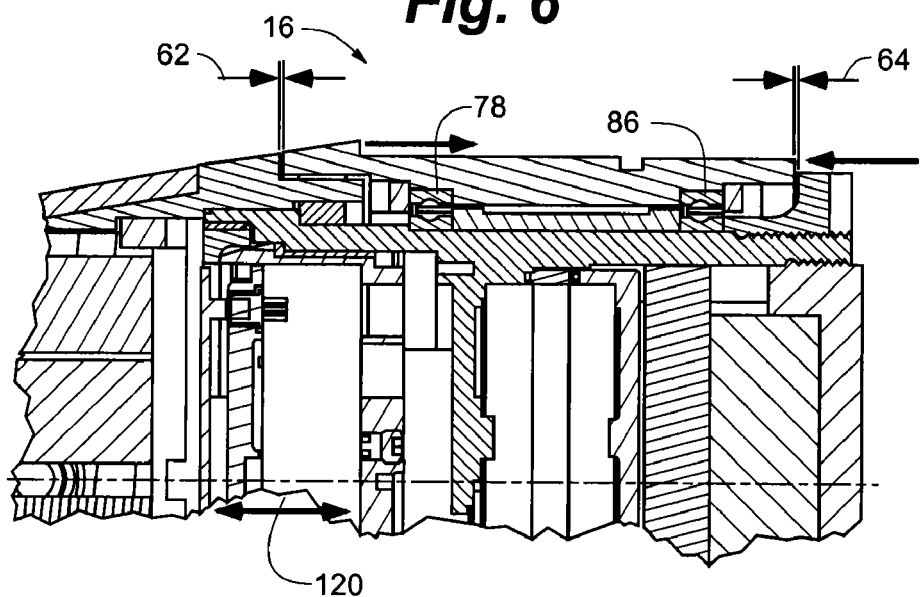
FIG. 6 is a sectional view of a portion of the GNC section depicting the impact of longitudinal forces on the GNC section.

Referring now to FIG. 4-6, the GNC section 16 includes a guidance and electronics unit (GEU) 30 that is disposed internal to the GNC section 16. A skin 32 is disposed as a portion of the external margin of the GEU 30. The skin 32 includes a transverse face 34 that is disposed transverse to the longitudinal axis 35 of the GNC section 16. A longitudinal face 36 is disposed orthogonally with respect to the transverse face 34. A relatively small step 37 is defined in the inner margin of the skin 32. A GEU retaining ring 40 is disposed interior to the skin 32. The GEU retaining ring 40 has threads 39a, 39b defined respectively on its exterior margin and its interior margin. The threads 39a defined on the exterior margin of the GEU retaining ring 40 are threadedly engaged with the threaded face 38 defined on the skin 32. The threads 39b defined on the interior face of the GEU retaining ring 40 are threadedly engaged with threads 41 defined on an inner spindle 42. The respective threaded engagements noted above of the GEU retaining ring 40 maintain the GEU 30 in its interior disposition in the GNC section 16.

The inner spindle 42 is of a generally cylindrical construction, defining an interior space for housing additional components of the GNC section 16. The trailing end (right end in the depiction of FIGS. 4-7) of the inner spindle 42 includes interior threads 43 and exterior threads 100. A boss 44 is defined at the leading portion (left end in the depiction of FIGS. 4-7) of the inner spindle 42. The boss 44 includes a step 46 against which the GEU retaining ring 40 is seated. A forward face 50 of the boss 44 bears on the step 37 of the skin 32.

Moving rearward from the boss 44, a bearing step 51 is defined in the outer margin of the inner spindle 42. As will be detailed below, the bearing step 51 defines in part the housing for the leading bearing 78.

A generally cylindrical spacer 52 is disposed around the exterior margin of the inner spindle 42. The spacer 52 is generally spool shaped, having a leading end 66 and a trailing end 70 with a reduced diameter waist 68 interposed between the leading end 66 and the trailing end 70. The leading end 66 has an outer margin 72 and the trailing end 70 has an outer margin 74. The leading edge 75 of the leading end 66 defines in part the housing for the leading bearing 78. The trailing edge 77 of the trailing end 70 defines in part the housing for the trailing bearing 86, as will be described in greater detail below.

An outer spindle 54 encloses a spacer 52 and in part defines the outer margin of the GNC section 16. The inner margin 55 of the outer spindle 54 is spaced apart from the spacer 52 to define an annular void 56 therebetween. The inner margin 55 is also spaced slightly apart from the respective outer margins 72 and 74 of the spacer 52. This spacing defines respective radial gaps or stops 104, 106.

The outer spindle 54 further includes a leading transverse face 58 and a trailing transverse face 60. The leading transverse face 58 is spaced apart from the adjacent transverse face 34 of skin 32 to define a setback gap 62. The trailing transverse face 60 is spaced apart from the leading transverse face 108 of the retainer 102 to define the set forward gap 64.

The design is such that the inner spindle 42 and the outer spindle 54 are free to rotate with respect to one another, except when under extreme loads, either longitudinal or transverse. In order to effect such rotation, a pair of roller bearings 78, 86 is interposed between the inner spindle 42 and the outer spindle 54. The leading bearing 78 is disposed in a housing defined cooperatively by the inner spindle 42, the outer spindle 54, the spacer 52, and a leading bearing retainer 94.

The leading bearing 78 includes an inner race 80, an outer race 82 and an interposed roller 84. The leading bearing 78 is circular extending circumferentially around the longitudinal axis 35 of the GNC section 16.

The trailing bearing 86 resides in a housing defined cooperatively by the inner spindle 42, the spacer 52, the outer spindle 54, outer trailing bearing retainer 96, and inner trailing bearing retainer 98. The trailing bearing 86 is of similar construction as the leading bearing 78. Accordingly, the trailing bearing 86 has an inner race 88, and outer race 90 and an interposed roller 92. The trailing bearing 86 is also circular extending circumferentially around the longitudinal axis 35 of the GNC section 16.

A retainer 102 is threadedly engaged with the threads 100 defined on the outer margin of the inner spindle 42. The retainer 102 acts in part to retain the trailing bearing 86 in the housing defined therefor.

In unloaded in flight operation, when there are minimal longitudinal and transverse forces acting on the GNC section 16, the inner spindle 42, which, as noted above, is fixedly coupled to the projectile body 12, is free to rotate with the projectile body 12, while the outer spindle 54 is held stationery by action of the deployed canards 22. The outer spindle 54 is isolated from the rotation of the inner spindle 42 by the supporting action of the bearings 78, 86. The problem arises when the GNC section 16 is loaded and there are either or both very large longitudinal or transverse forces imposed on the GNC section 16, particularly during the launch event and immediately thereafter. The severity of such forces requires that the bearings 78, 86 be isolated from the greater portion of such forces or risk crushing the bearings.

Referring to FIG. 5, set forward force and set back force is indicated by the arrow 120. The forces 120, both set forward and set back, can be significant during launch and immediately thereafter. Structure is needed to be designed to protect the bearings 78, 86 from the imposition of such forces. The solution resides in the set back gap 62 and the set forward gap 64. The structure defining the respective gaps 62, 64 acts as a stop, preventing excessive forces from being transmitted to the respective bearings 78,86. With the imposition of such respective forces, the structure defining the leading portion of the respective gaps 62, 64 bears on the structure defining the rearward portion of the respective gaps 62, 64. The gaps 62, 64 are thereby closed by respective set back force and set forward force. As such, the structure defining the GNC section 16 bears such forces, thereby preventing such forces being imposed upon the bearings 78, 86. While the gaps 62, 64 are closed, the inner spindle 42 and the outer spindle 54 are effectively clamped together and the bearings 78, 76 are slightly compressed, as indicated in the force diagram at the right of FIG. 6. Withdrawal of such forces opens the respective gaps 62, 64 and thereby permits the GNC section 16 to return to the in flight configuration as described above.

Figure 7:
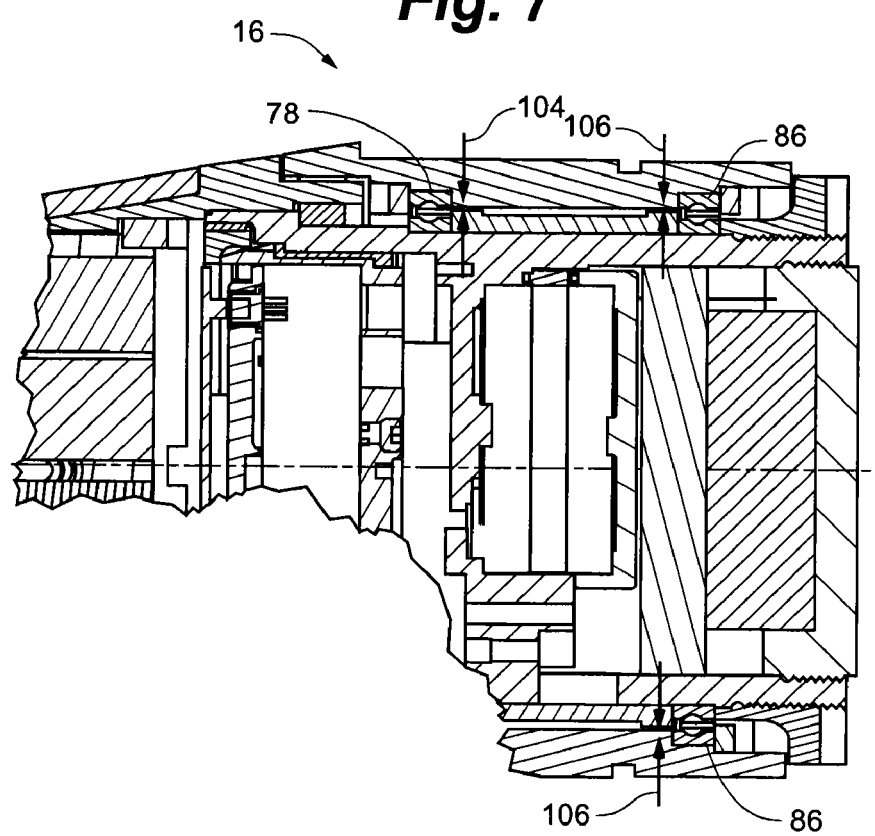
FIG. 7 is a sectional view of a portion of the GNC section depicting the impact of radial forces on the GNC section.

Referring to FIG. 7, transverse or side forces are noted as a balloting force and a lift force. In a manner similar to that described above, the radial gaps (stops) 104, 106 prevent the imposition of excessive transverse forces on the bearings 78, 86 by acting as a structural stop. With the imposition of such transverse forces, the structure defining the radial gaps 104, 106 is closed, such that such structure is bearing on one another and the respective bearings 78, 86 are spared the potentially crushing effects of such forces. While the gaps 104, 106 are closed, the inner spindle 42 and the outer spindle 54 are effectively clamped together and the bearings 78, 76 are slightly compressed, as indicated in the force diagram at the right of FIG. 7. Withdrawal of such forces permits the GNC section 16 to return to the in flight configuration as described above.

Figure 8:
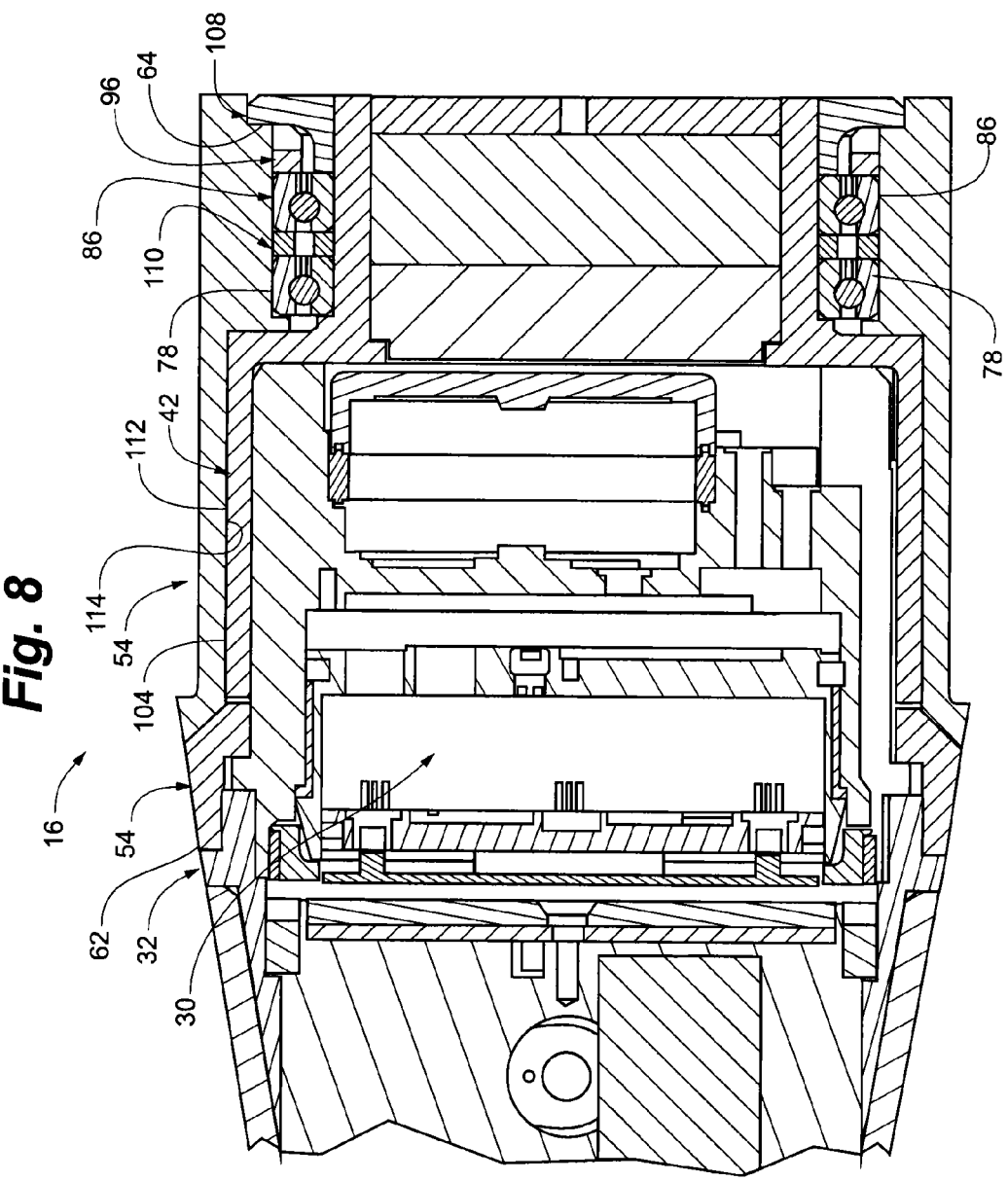
FIG. 8 is a sectional view of an alternative embodiment of the present invention.

An alternative embodiment of the present invention is depicted in FIG. 8. Components noted in FIG. 8 that are like components as noted with reference to the embodiment noted above have like numerical designations. The two bearings 78, 86 are positioned adjacent one another with a spacer 110 interposed therebetween. There is a single radial gap 104 that extends along the interface of the inner margin 112 of the outer spindle 54 and the outer margin 114 of the inner spindle 42. It should be noted that a single, larger bearing could be substituted for the two bearings 78, 86 are positioned adjacent one another. Operation of the alternative embodiment under load and in flight is as noted above.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A GNC device for use with a projectile, comprising:
a rotating GNC portion and a non-rotating GNC portion, the rotating GNC portion being fixedly coupled to a projectile body, the non-rotating GNC portion decoupled from the projectile body, at least one bearing being interposed between the rotating GNC portion and the non-rotating GNC portion, the at least one bearing permitting the rotating GNC portion to rotate with respect to the non-rotating GNC portion, and a first pair of stops, each of the respective stops of the pair of stops defining a gap between the rotating GNC portion and the non-rotating GNC portion during unloaded conditions.

2. The GNC device of claim 1, wherein a longitudinal force acting in a first direction closes a first of the first pair of stops.

3. The GNC device of claim 2, wherein the longitudinal force acting in a second opposed direction closes the second of the first pair of stops.

4. The GNC device of claim 3, wherein the respective closing of either of the stops of the first pair of stops acts to prevent the imposition of the respective longitudinal forces on the at least one bearing.

5. The GNC device of claim 3, wherein the respective closing of either of the stops of the first pair of stops acts to cause the rotating GNC portion and the non-rotating GNC portion to rotate in engaged unison.

6. The GNC device of claim 5, including a second pair of stops, each of the respective stops of the second pair of stops defining a gap between the rotating GNC portion and the non-rotating GNC portion during unloaded conditions.

7. The GNC device of claim 6, wherein a transverse force acts to close the second pair of stops.

8. The GNC device of claim 7, wherein the respective closing of the second pair of stops acts to prevent the imposition of the transverse force on the at least one bearing.

9. The GNC device of claim 6, wherein the respective closing of the second pair of stops acts to cause the rotating GNC portion and the non-rotating GNC portion to rotate in engaged unison.

10. A GNC device for use with a projectile, comprising:
a rotating GNC portion and a non-rotating GNC portion, the rotating GNC portion being fixedly coupled to a projectile body, the non-rotating GNC portion decoupled from the projectile body, at least one bearing means being interposed between the rotating GNC portion and the non-rotating GNC portion, the at least one bearing means for permitting the rotating GNC portion to rotate with respect to the non-rotating GNC portion, and a first pair of stop means, each of the respective stop means of the pair of stop means for defining a gap between the rotating GNC portion and a non-rotating GNC portion during unloaded conditions.

11. The GNC device of claim 10, wherein a longitudinal force acts in a first direction acting to close a first of the first pair of stop means.

12. The GNC device of claim 11, wherein longitudinal force acts in a second opposed direction to close the second of the first pair of stop means.

13. The GNC device of claim 12, wherein the respective closing of either of the stop means of the first pair of stop means is for acting to prevent the imposition of the respective longitudinal forces on the at least one bearing.

14. The GNC device of claim 13, wherein the respective closing of either of the stop means of the first pair of stop means is for acting to cause the rotating GNC portion and the non-rotating GNC portion to rotate in engaged unison.

15. The GNC device of claim 14, including a second pair of stop means, each of the respective stop means of the second pair of stop means for defining a gap between the rotating GNC portion and the non-rotating GNC portion during unloaded conditions.

16. The GNC device of claim 15, wherein a transverse force acts to close the second pair of stop means.

17. The GNC device of claim 16, wherein the respective closing of the second pair of stop means is for acting to prevent the imposition of the transverse force on the at least one bearing.

18. The GNC device of claim 16, wherein the respective closing of the second pair of stop means is for acting to cause the rotating GNC portion and the non-rotating GNC portion to rotate in engaged unison.

19. In a GNC device for use with a projectile, a method comprising:
interposing at least one bearing between a rotating GNC portion and a non-rotating GNC portion , and a first pair of stop means, each of the respective stop means of the pair of stop means for defining a gap between the rotating GNC portion and a non-rotating GNC portion during unloaded conditions, and permitting the rotating GNC portion to rotate with respect to the non-rotating GNC portion by means of the at least one bearing.

* * * * *